United States Patent
Suzuki

[19]

[11] Patent Number: 6,144,192
[45] Date of Patent: Nov. 7, 2000

[54] ABNORMAL HEAVY CURRENT PRODUCTION PREVENTING APPARATUS

[75] Inventor: Ryoichi Suzuki, Yokohama, Japan

[73] Assignee: Canon Kabushiki Kaisha, Tokyo, Japan

[21] Appl. No.: 09/294,110

[22] Filed: Apr. 19, 1999

[30] Foreign Application Priority Data

Apr. 22, 1998 [JP] Japan ................................ 10-128270

[51] Int. Cl.[7] ................................ G05F 1/10; H02H 7/10
[52] U.S. Cl. .......................... 323/222; 323/284; 363/50
[58] Field of Search .......................... 363/50; 320/128, 320/129; 323/222, 284, 351, 276

[56] References Cited

U.S. PATENT DOCUMENTS

| | | | |
|---|---|---|---|
| 3,805,795 | 4/1974 | Denniston et al. | 607/6 |
| 4,464,709 | 8/1984 | Barter | 363/16 |
| 4,999,663 | 3/1991 | Nakamura | 396/89 |
| 5,323,102 | 6/1994 | Torii et al. | 322/90 |
| 5,371,568 | 12/1994 | Takagi et al. | 396/157 |
| 5,598,100 | 1/1997 | Maeda et al | 324/501 |
| 5,672,918 | 9/1997 | Kimbrough et al. | 307/126 |
| 5,850,136 | 12/1998 | Kaneko | 320/119 |

*Primary Examiner*—Adolf Deneke Berhane
*Attorney, Agent, or Firm*—Fitzpatrick, Cella, Harper & Scinto

[57] ABSTRACT

Preventing apparatus includes a switch in series with a battery in a DC/DC converter or a motor driving circuit driven by the battery. The apparatus is also provided with a detector for detecting the gate voltage of a heavy current driving FET transistor or the like used in the DC/DC converter or the motor driving circuit. The detector switches off the switch to thereby prevent an abnormal heavy current from continuing to flow, except during the normal operation period of the DC/DC converter or the motor driving circuit, when it is detected that the gate voltage of the FET transistor is at a predetermined value or higher.

11 Claims, 3 Drawing Sheets

ABNORMAL HEAVY CURRENT PRODUCTION PREVENTING APPARATUS

BACKGROUND OF THE INVENTION

1. Field of the Invention

This invention relates to a countermeasure for accidents on an electric circuit substrate, and particularly to the prevention of the production of an abnormal heavy current when a short-circuiting accident between circuit substrate patterns occurs. The accident may occur due to a solder ball or the like formed during the mounting of an electric element on an electric circuit substrate.

2. Related Background Art

When in various electric apparatuses, patterns on a substrate are short-circuited due to a solder ball or the like formed during mounting operations, various abnormal states occur. An example will hereinafter be described with reference to FIG. 3 of the accompanying drawings.

FIG. 3 is a circuit diagram of a DC/DC converter driven by a battery. In FIG. 3, the reference numeral 100 designates a lithium battery, the reference numeral 101 denotes a control circuit, the reference numeral 102 designates a coil, the reference numeral 103 denotes a switching FET transistor, the reference numeral 104 designates a diode, and the reference numerals 106 and 107 denote resistors for dividing the output voltage of the DC/DC converter, and the divided voltages are fed back to the control circuit 101. The reference numeral 105 designates a smoothing capacitor.

This DC/DC converter circuit transfers electrical energy stored in the coil to the capacitor 105 in conformity with the repetitive switching operation of the FET transistor 103 to thereby obtain a boosted output.

In the usual operation, the divided voltages of the resistors 106 and 107 of the output voltage of the DC/DC converter are inputted to the control circuit 101, which controls the duty width of the switching of FET transistor 103 so that the divided voltages may assume predetermined values, whereby a predetermined DC/DC output voltage can be obtained.

In such a circuit, for example, consider a case where, due to a solder ball or the like formed during the mounting of an electric element, the gate terminal of the FET transistor 103 in FIG. 3 and the positive pole of the battery 100 are short-circuited, as indicated by a dotted line a.

In this case, the gate of the FET transistor 103 is deeply biased by the voltage of the battery, and therefore, the FET transistor 103 becomes completely turned on. Consequently, an electric current determined by the resistance of the coil 102 and the ON resistance of the transistor 103 flows from the battery 100. However, the two resistance values are 1 ohm or less, and thus, a heavy current of several amperes flows out of the battery 100. If such a state lasts long, the FET transistor 103 may generate heat, and further may emit smoke. Particularly, when a transistor of a surface-mounted type having a low heat capacity is used as the FET transistor, this riskiness is high.

In order to prevent such an accident, it is conceivable to connect a fuse in series with the battery 100 and for this fuse to be cut off when the above-mentioned abnormal heavy current flows, to thereby prevent such an accident. But as a realistic problem, the setting of this fuse is difficult for the following reason.

In the case of the load of an actuator or the like, a considerable electric current flows from the output of the DC/DC converter even in a normal state, and a greater electric current flows from the battery 100. In this case, the fuse must not be cut off. On the other hand, for a heavy current in an abnormal state due to an accident, the fuse must be reliably cut off. The value of the heavy current in such an abnormal state due to an accident is considerably changed by the irregularity of the remaining capacity of the battery 100 and of the ON resistance value of the FET transistor 103. Consequently, the setting of a fuse which is not cut off for a heavy current in a normal state and is reliably cut off for a heavy current in an abnormal state due to an accident is often difficult.

SUMMARY OF THE INVENTION

It is an object of the present invention to solve the above-noted problem and to provide an abnormal heavy current production preventing apparatus for preventing the production of an abnormal heavy current without using a fuse.

It is another object of the present invention to directly detect the short-circuiting phenomenon of the gate terminal of an FET transistor and the positive pole of a battery by a solder ball or the like, and open switch means connected in series with the battery to thereby prevent a heavy current due to an accident from continuing to flow.

Further objects of the present invention will become apparent from the following description of some specific embodiments of the invention.

DESCRIPTION OF THE PREFERRED EMBODIMENTS

Some embodiments of the present invention will hereinafter be described with reference to the drawings.

The following embodiments are ones in which the present invention is applied to a single-lens reflex camera and an interchangeable lens system.

(Embodiment 1)

Figure 1:
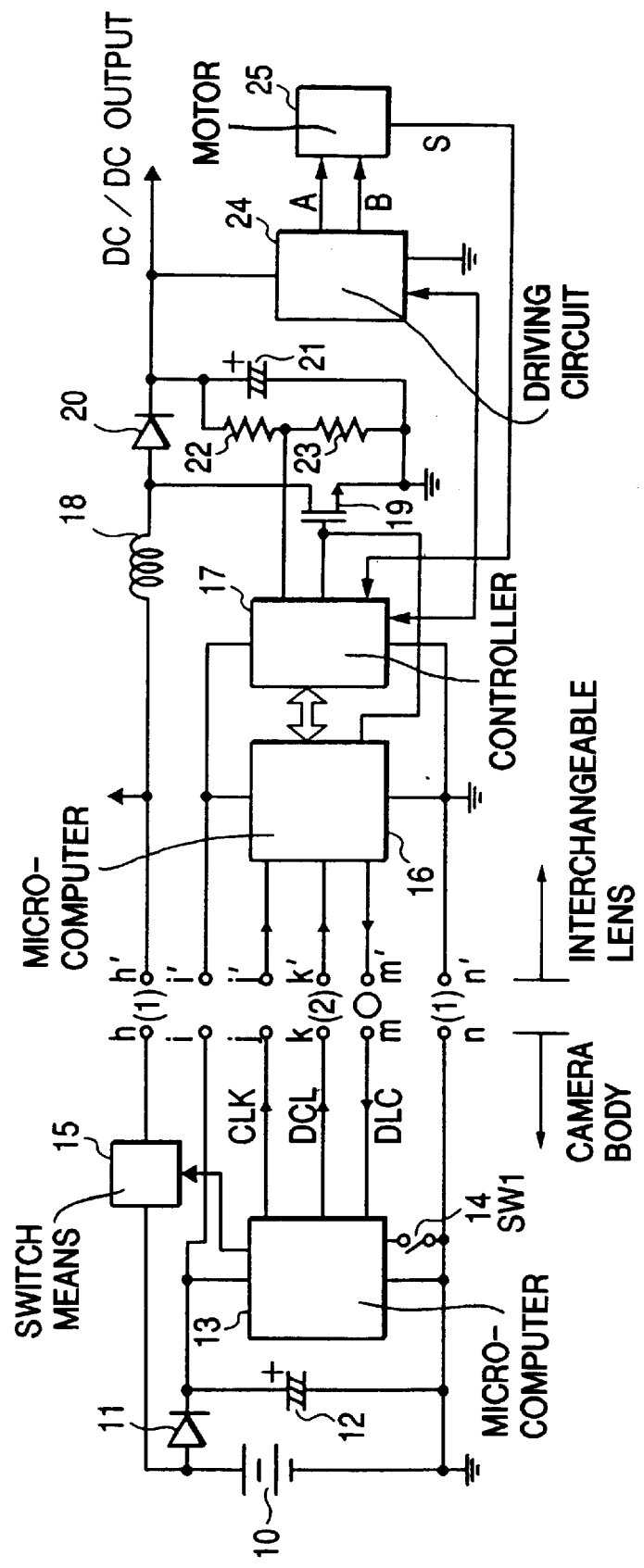
FIG. 1 is a diagram of an abnormal heavy current production preventing circuit according to Embodiment 1 of the present invention.

FIG. 1 is an electric circuit diagram of Embodiment 1 of the present invention. The construction of a camera body side will first be described. In FIG. 1, the reference numeral 10 designates a lithium battery contained in the camera body, the reference numeral 11 denotes a back flow preventing diode, and the reference numeral 12 designates a back-up capacitor which is the power source of a control circuit system such as a microcomputer. The reference numeral 13 denotes a camera body side microcomputer, and the reference numeral 14 designates a switch (SW1) adapted to be opened by a first stroke of the release button of the camera. The reference numeral 15 denotes switch means connected to the positive pole of the battery 10 and ON/OFF-controlled by the output port of the microcomputer 13.

Letters h to k, m and n designate electrical contacts with an interchangeable lens provided on the camera body side. The letter h denotes a power source terminal connected to the switch means 15, the letter i designates a power source terminal for a control system connected to the capacitor 12, and the letter j denotes a terminal connected to the output port of the microcomputer 13 for transferring a clock CLK for communication to the interchangeable lens side. The letter k designates a terminal also connected to the output port of the microcomputer for transferring data DCL from the camera to the lens. The letter m denotes a terminal connected to the input port of the microcomputer 13 for transferring data DLC from the lens to the camera. The letter n designates a gland terminal connected to the negative pole of the battery.

The construction of the interchangeable lens side will now be described. Letters h' to k', m' and n' denote electrical contacts provided on the interchangeable lens side, and when the interchangeable lens is mounted on the camera body, the electrical contacts h' to k', m' and n' are connected to the electrical contacts h to k, m and n of the camera body side. The reference numeral 16 designates a microcomputer on the interchangeable lens side, and the reference numeral 17 denotes an I/O producing various control signals for controlling a DC/DC converter, which will be described later. The I/O 17 is connected to the input and output ports of the microcomputer 16.

The reference numeral 18 designates a coil connected to the power source terminal h', and the reference numeral 19 denotes an FET transistor of N channels having its drain connected to the coil 18 and having its gate connected to the I/O 17 and connected also to the input port of the microcomputer 16. The reference numeral 20 designates a diode, the reference numeral 21 denotes a smoothing capacitor, and the reference numerals 22 and 23 designate voltage dividing resistors for dividing the output voltage of the DC/DC converter, and the divided voltages thereof are fed back to the I/O 17.

The reference numeral 24 denotes a driving circuit for driving an ultrasonic motor (hereinafter simply referred to as the USM motor), and the reference numeral 25 designates the USM motor. The USM motor 25 has its A phase and B phase driven by the driving circuit 24, and an S phase signal is fed back to the I/O 17.

Description will now be made of the operation of the present embodiment constructed as described above.

When the first stroke of the release button of the camera body side is first depressed, the switch SW1 14 is closed. Thereupon, the microcomputer 13 of the camera side closes the switch means 15, and therefore, electric power is supplied from the battery 10 of the camera side to the interchangeable lens side through the terminals h-h' and n-n'.

Next, the microcomputer 13 of the camera side sends a command for starting the operation of the DC/DC converter to the microcomputer 16 of the lens side through the terminals k-k', and in accordance with the command, the microcomputer 16 of the lens side controls the gate terminal of the FET transistor 19 through the I/O 17, and starts the switching operation. In response to this switching operation, a boosted voltage is generated in the smoothing capacitor 21 by the aforedescribed principle. The divided voltages of this boosted voltage by the voltage dividing resistors 22 and 23 are fed back to the I/O 17, and the duty ratio of the switching of the FET transistor 19 is controlled so that the divided voltages may assume predetermined values, whereby a DC/DC output is obtained.

Next, the microcomputer 13 of the camera side sends a command for starting the driving of the USM motor to the microcomputer 16 of the lens side, and in accordance with the command, the microcomputer 16 of the lens side controls the I/O 17 and varies the frequency of a continuous pulse given to the USM driving circuit 24 from a high frequency to a low frequency side, thereby starting the accelerating operation of the USM motor 25.

At this time, the in-focus judging device (not shown) of the camera body side is operating and sequentially detects the focus state of the interchangeable lens. In conformity with this detected focus signal, the microcomputer 13 of the camera side sends a command to the microcomputer 16 of the lens side, and in accordance with the command, the microcomputer 16 of the lens side controls the I/O 17 and now varies the frequency of the continuous pulse given to the USM driving circuit 24 from a low frequency to a high frequency side, thereby effecting the decelerating operation of the USM motor 25.

When the in-focus judging device detects the infocus state of the interchangeable lens, the microcomputer 16 of the lens side controls the I/O 17 by the flow of the command signal and further heightens the frequency of the continuous pulse given to the USM driving circuit, thereby effecting the stopping operation of the USM motor 25.

After the USM motor 25 is stopped, the microcomputer 13 of the camera side sends a command for stopping the operation of the DC/DC converter to the microcomputer 16 of the lens side, and in accordance with this command, the microcomputer 16 of the lens side controls the I/O 17 to thereby stop the switching operation of the FET transistor 19. Consequently, the output voltage of the DC/DC converter disappears. Also, at this time, the gate voltage of the FET transistor 19 is at a LOW level. What has been described above is a series of operations in a normal state.

Although not shown in FIG. 1, the power source line of the terminal h' of the interchangeable lens side is used as the power source of not only the DC/DC converter but also a stepping motor for driving an aperture. That is, still after the power supply to the USM motor 25 for focus driving is terminated and the operation of the DC/DC converter is terminated, the power source switch means 15 of the camera side is kept ON so that the aperture driving operation at the start of the shutter opening and closing operation by a second stroke of the release button of the camera can be performed.

The operation in an abnormal state will now be described. Consider a case where the gate terminal of the FET transistor 19 constituting the DC/DC converter and the power source terminal h' are short-circuited by a solder ball or the like.

When the switch SW1 14 is closed by the first stroke of the release button of the camera, the microcomputer 13 of the camera side closes the power source switch means 15, and therefore, electric power is supplied from the battery 10 of the camera side to the interchangeable lens side. As a result, the gate voltage of the FET transistor 19 becomes equal to the voltage of the battery, and this FET transistor is turned on. Thus, a heavy current flows from the battery 10 to the lens side.

Usually, there is some time lag from after the switch SW1 14 has been closed until the microcomputer 13 sends the signal of the command for starting the operation of the DC/DC converter to the microcomputer 16 of the lens side.

The reason is that since the supply of electric power to the metering circuit and distance measuring circuit of the camera side is started after the switch SW1 is closed, it is necessary to effect the driving of the USM motor 25 after waiting for those circuits to become stabilized.

Accordingly, when the microcomputer 16 of the lens side detects that the gate voltage of the FET transistor 19 is a predetermined value or greater before the command for starting the operation of the DC/DC converter comes from the microcomputer 13 of the camera side, the microcomputer 16 can judge that the FET transistor 19 is in an abnormal state. At this time, the microcomputer 16 of the lens side sends a signal for requiring the power source to be switched off to the microcomputer 13 of the camera side through the terminals m-m'. In response to this signal for requiring the power source to be switched off, the microcomputer 13 of the camera side opens the power source switch means 15. As a result, the supply of electric power to the interchangeable lens is cut off, and therefore, the accident of an abnormal heavy current continuing to flow is obviated.

In the foregoing description, a case has been described for the timing after the first stroke of the release button of the camera is depressed, the switch SW1 is closed, and the power source switch means 15 is closed and before the microcomputer 16 of the lens side receives the command for starting the operation of the DC/DC converter from the microcomputer 13 of the camera side. But this timing is not restrictive. In a normal operation, any timing, at which the gate voltage of the FET transistor 19 should originally be low, will do.

(Embodiment 2)

Figure 2:
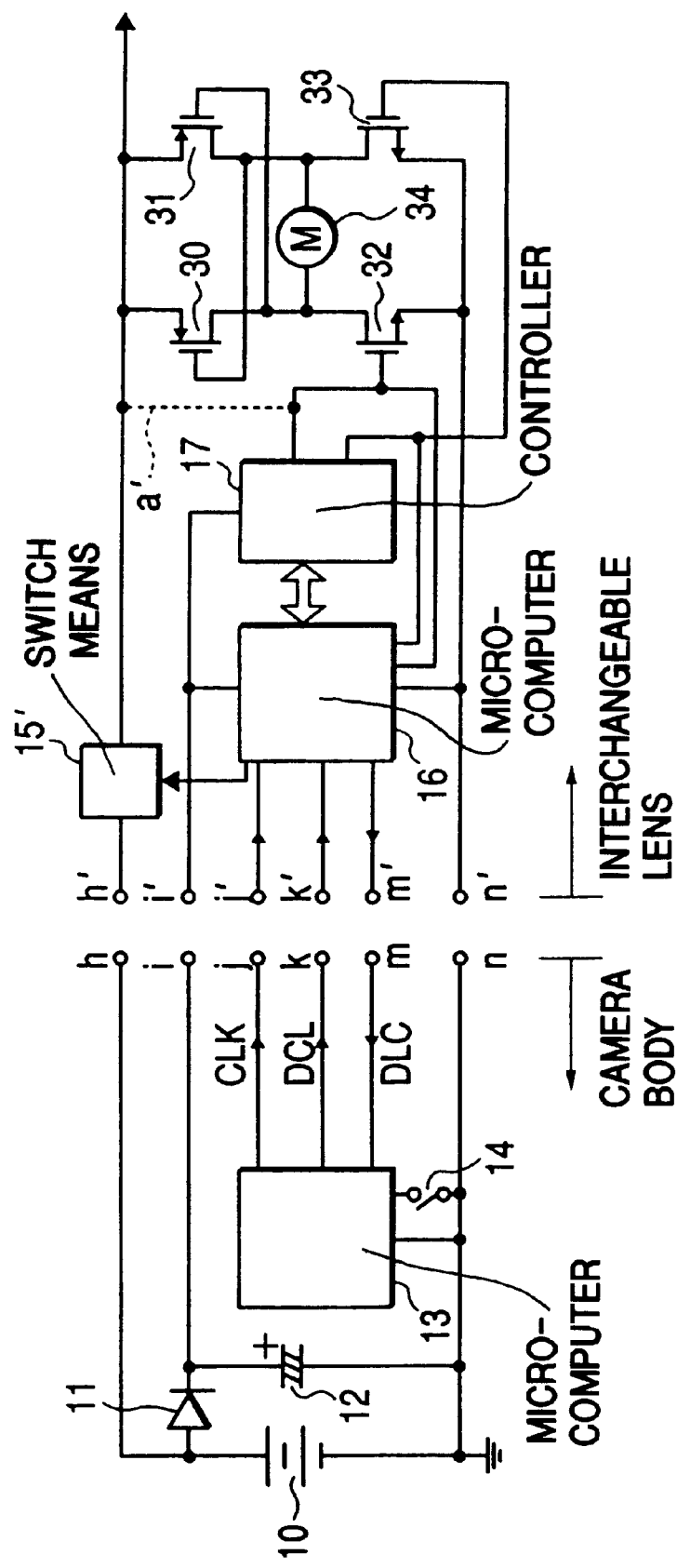
FIG. 2 is a diagram of an abnormal heavy current production preventing circuit according to Embodiment 2 of the present invention.
Figure 3:
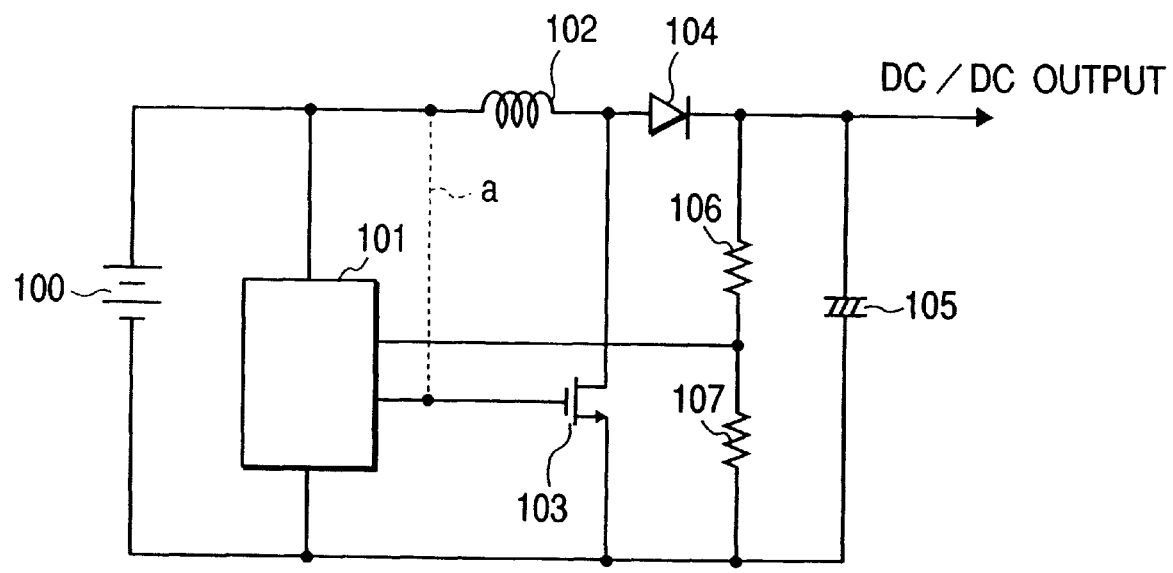
FIG. 3 is a circuit diagram illustrating the production of an abnormal heavy current.

Embodiment 2 of the present invention will now be described. FIG. 2 is an electric circuit diagram of Embodiment 2. This embodiment differs from Embodiment 1 in that as the focus driving motor of the interchangeable lens side, an ordinary DC motor, is used instead of the USM motor and further, the switch means for cutting off the power source is provided not on the camera side, but on the lens side. In FIG. 2, the same reference characters as those shown in FIG. 1 designate the same constituent parts and therefore need not be described.

The reference numeral 15' designates switch means connected to the power source terminal h' of the lens side, and ON/OFF-controlled by the microcomputer 16 of the lens side. The reference numerals 30 and 31 denote FET transistors of P channels constituting a motor driving bridge circuit. The reference numerals 32 and 33 designate FET transistors of N channels also constituting a bridge circuit, and the gates thereof are connected to the microcomputer 16 of the lens side and the I/O 17, respectively.

The gates of the FET transistors 30 and 31 of P channels are connected to the drains of the FET transistors 33 and 32, respectively, of N channels. The reference numeral 34 denotes a DC motor for driving a focusing lens, and it is connected to the drains of the FET transistors 30 to 33.

The operation of the circuit of Embodiment 2 constructed as described above will hereinafter be described. The operation of this circuit in a normal state will first be described. When the switch SW1 14 is closed by the first stroke of the release button of the camera body side, the microcomputer 13 of the camera side sends a power source ON command signal to the microcomputer 16 of the lens side through the terminals k-k', and in response to this signal, the microcomputer 16 of the lens side closes the power source switch means 15'.

After the switch SW1 14 is closed and the operations of the metering circuit and distance measuring circuit of the camera side have become stable, the microcomputer 13 of the camera side sends a command signal for starting the focusing operation to the microcomputer 16 of the lens side, and in response to this signal, the microcomputer 16 of the lens side reverses the output port connected to the gate of the FET transistor 32 of N channels to a HIGH level. As a result, this FET transistor 32 is turned on, and the drain voltage thereof assumes a gland level. Thereby, the gate voltage of the FET transistor 31 of P channels assumes a LOW level, and therefore, this FET transistor 31 is turned on. Therefore, an electric current flows to the DC motor 34 in the leftward direction as viewed in the circuit diagram of FIG. 2 (that is, an electric current flows to the turned-on FET transistor 31, the motor 34, and the turned-on FET transistor 32 in the named order), and the focus driving operation of the lens is started. The I/O 17 of the lens side is designed to be capable of giving a continuous pulse waveform to the FET transistors 32 and 33 and effecting the so-called PWM control.

After the driving of the focusing lens by the DC motor 34 is started, the microcomputer 13 of the camera side sends a signal conforming to the result of the judgement by the in-focus judging device of the camera body side to the microcomputer 16 of the lens side, and by this signal, the microcomputer 16 of the lens side PWM-controls the I/O 17 and adjusts the speed of the DC motor 34. When the in-focus judging device of the camera body side judges that the lens is in focus, that information is sent to the microcomputer 16 of the lens side, and therefore, the microcomputer 16 of the lens side controls the I/O 17 and reverses the gate voltage of the FET transistor 32 to a LOW level, and turns off this FET transistor 32 to thereby stop the supply of electric power to the motor 34, thus stopping the driving of the focusing lens. When during this stopping operation, a HIGH signal is given to the gate terminal of the FET transistor 33 of N channels for some time and a reverse electric current is supplied to the motor 34 to thereby effect a braking operation, a rapid stopping operation can be performed. What has been described above is the description of the focusing driving operation of the focusing lens in a normal state.

The operation in an abnormal state will now be described. Consider a case where as in Embodiment 1, the gate terminal of the motor driving FET transistor 32 and the power source line are short-circuited, as indicated by a dotted line a', by a solder ball created during the mounting of an electrical element.

When the switch SW1 14 is closed by the first stroke of the release button of the camera body, the microcomputer 13 of the camera side sends a power source ON command signal to the microcomputer 16 of the lens side, as previously described, and in response to this signal, the microcomputer 16 of the lens side closes the power source switch means 15'. Due to the short-circuiting phenomenon indicated by the dotted line a', the gate of the FET transistor 32 is deeply biased by the voltage of the battery, and this FET transistor 32 is turned on and the drain terminal thereof assumes a LOW level. As a result, the FET transistor 31 of P channels is also turned on, and an electric current flows to the motor 34 in the leftward direction as viewed in the circuit diagram of FIG. 2. Thus, the operation of supplying electric power to the motor 34 is performed before a command signal for the supply of electric power to the motor comes from the microcomputer 13 of the camera side to the microcomputer 16 of the lens side, and this is inconvenient.

In this Embodiment 2, in order to obviate the occurrence of an abnormal state, before a command signal for the supply of electric power to the motor comes from the microcomputer of the camera side to the microcomputer of the lens side, the microcomputer 16 of the lens side detects the level of the port connected to the gate of the FET transistor 32 of N channels, and if the voltage of this port is at a HIGH level, the lens side opens the power source switch means 15'. Thereby, the operation of supplying electric power to the motor 34 is stopped, and the abnormal state is dissolved. In this embodiment, the timing at which the microcomputer 16 of the lens side detects the gate voltage of the FET transistor 32 of N channels is set between the time when the microcomputer 16 of the lens side closes the power source switch means 15' and the time when the microcomputer 16 of the lens side receives a command signal for starting the supply of electric power to the motor 34 from the microcomputer 13 of the camera side. The present invention is not restricted thereto, but in a normal sequence, any timing at which the gate voltage of the FET transistor of N channels should be at a LOW level will do.

As described above, according to the present invention, even if the short-circuiting phenomenon between substrate patterns is caused, for example, by a solder ball or the like during mounting, the phenomenon is detected by the detection of the voltage of the control terminal of the driving means and the power source switch means is opened to thereby prevent an abnormal heavy current from flowing. As compared with the case where a fuse is used, the phenomenon that an abnormal heavy current flows from the battery can be prevented more reliably.

What is claimed is:

1. An abnormal heavy current production preventing apparatus including:
   a power source battery;
   a DC/DC converter driven by said power source battery, said DC/DC converter transferring electrical energy stored in a coil to a capacitor in conformity with the repetitive switching operation of an FET transistor to thereby obtain a boosted output;
   a power source switch provided between said power source battery and said DC/DC converter; and
   detecting means for detecting the gate voltage of said FET transistor, said detecting means switch-operating said power source switch to thereby stop the driving of said DC/DC converter when it detects, except during the normal operation period of said DC/DC converter, that the gate voltage of said FET transistor is at a predetermined value or higher.

2. An abnormal heavy current production preventing apparatus including:
   a power source battery;
   a DC/DC converter driven by said power source battery, said DC/DC converter transferring electrical energy stored in a coil to a capacitor in conformity with the repetitive switching operation of an FET transistor to thereby obtain a boosted output;
   power source switch means provided between said power source battery and said DC/DC converter,
   detecting means for detecting the gate voltage of said FET transistor; and
   control means for sending a power source OFF signal to said power source switch means when it is detected by said detecting means that the gate voltage of said FET transistor is at a predetermined value or higher at the timing when the gate voltage of said FET transistor should be at a low level.

3. An abnormal heavy current production preventing apparatus according to claim 2, wherein the output of said DC/DC converter is used for the lens driving motor of a camera.

4. An abnormal heavy current production preventing apparatus according to claim 3, wherein said camera comprises a camera body and an interchangeable lens, said camera body is provided with the power source battery, the power source switch means and the control means, and said interchangeable lens is provided with the DC/DC converter and the detecting means.

5. An abnormal heavy current production preventing apparatus, comprising:
   a power source battery;
   an electrical load through which a relatively great load current flows;
   driving means for driving said electrical load;
   a power source switch provided between said power source battery and said electrical load;
   control means for controlling a control terminal of said driving means; and
   detecting means for detecting the voltage of said control terminal,
   wherein said control means opens said power source switch when, during non-operation, said detecting means detects that the voltage level of said control terminal is at a predetermined value or higher.

6. An abnormal heavy current production preventing apparatus according to claim 5, wherein said driving means is an FET transistor.

7. An abnormal heavy current production preventing apparatus according to claim 5, wherein said electrical load is a coil constituting a part of a DC/DC converter.

8. An abnormal heavy current production preventing apparatus according to claim 5, wherein said electrical load is a DC motor.

9. An abnormal heavy current production preventing apparatus according to claim 5, wherein said detecting means is a microcomputer.

10. An abnormal heavy current production preventing apparatus according to claim 5, wherein the detection of the voltage level by said detecting means is effected at a predetermined timing.

11. An abnormal heavy current production preventing apparatus, comprising:
    a power source battery;
    a DC/DC converter driven by said power source battery, said DC/DC converter obtaining an output boosted in conformity with the repetitive switching operation of an FET transistor;
    an electrical load to which the output boosted by said DC/DC converter is applied and through which a relatively great load current flows;
    power source switch means provided between said power source battery and said electrical load,
    detecting means for detecting the gate voltage of said FET transistor, said detecting means switch-operating said power source switch to thereby stop the driving of said DC/DC converter when it detects, except during the normal operation period of said DC/DC converter, that the gate voltage of said FET transistor is at a predetermined value or higher; and
    control means for sending a power source OFF signal to said power source switch means when it is detected by said detecting means that the gate voltage of said FET transistor is at a predetermined value or higher at the timing when the gate voltage of said FET transistor is at a low level.

* * * * *

UNITED STATES PATENT AND TRADEMARK OFFICE
CERTIFICATE OF CORRECTION

PATENT NO.    : 6,144,192
DATED         : November 7, 2000
INVENTOR(S)   : Ryoichi Suzuki Page 1 of 1

It is certified that error appears in the above-identified patent and that said Letters Patent is hereby corrected as shown below:

Column 4,
Line 14, "infocus" should read -- in-focus --.

Column 5,
Line 27, "DC motor," should read -- DC motor -- and "USM motor" should read -- USM motor, --.

Column 8,
Line 48, "load," should read -- load; --.

Signed and Sealed this

Twenty-ninth Day of January, 2002

Attest:

*Attesting Officer*

JAMES E. ROGAN
*Director of the United States Patent and Trademark Office*